United States Patent
Slutsky et al.

(10) Patent No.: US 10,049,454 B2
(45) Date of Patent: Aug. 14, 2018

(54) ACTIVE TRIANGULATION CALIBRATION

(71) Applicant: MANTISVISION LTD., Petach Tikva (IL)

(72) Inventors: Michael Slutsky, Kfar Saba (IL); Yonatan Samet, Givataim (IL); Eyal Gordon, Haifa (IL)

(73) Assignee: MANTIS VISION LTD., Petach Tikva (IL)

( * ) Notice: Subject to any disclaimer, the term of this patent is extended or adjusted under 35 U.S.C. 154(b) by 0 days.

(21) Appl. No.: 14/749,306

(22) Filed: Jun. 24, 2015

(65) Prior Publication Data

US 2015/0370348 A1   Dec. 24, 2015

Related U.S. Application Data

(60) Provisional application No. 62/016,278, filed on Jun. 24, 2014.

(51) Int. Cl.

| | |
|---|---|
| *G06F 3/03* | (2006.01) |
| *G06F 7/00* | (2006.01) |
| *G06T 7/00* | (2017.01) |
| *G06F 3/041* | (2006.01) |
| *G06F 3/042* | (2006.01) |
| *G06T 7/521* | (2017.01) |

(52) U.S. Cl.
CPC .......... *G06T 7/0018* (2013.01); *G06F 3/0416* (2013.01); *G06F 3/0418* (2013.01); *G06F 3/0425* (2013.01); *G06T 7/521* (2017.01)

(58) Field of Classification Search
CPC . G06T 7/0018; G06T 15/205; G06T 2200/04; G06T 2207/10021; G06T 7/002; G06T 17/00; G06T 2207/10028; G06K 9/2036; G06K 9/3216; G01B 11/2513; G01B 11/25; G01B 11/2545; H04N 13/0246
See application file for complete search history.

(56) References Cited

U.S. PATENT DOCUMENTS

| | | | |
|---|---|---|---|
| 2008/0118143 A1* | 5/2008 | Gordon | G01B 11/2513 382/154 |
| 2010/0074532 A1* | 3/2010 | Gordon | G01B 11/25 382/203 |

* cited by examiner

*Primary Examiner* — Kim Vu
*Assistant Examiner* — Michael Vanchy, Jr.
(74) *Attorney, Agent, or Firm* — Vladimir Sherman; Professional Patent Solutions Ltd.

(57) ABSTRACT

According to examples of the presently disclosed subject an active triangulation system includes an active triangulation setup and a calibration module. The active triangulation setup includes a projector and a sensor. The projector is configured to project a structured light pattern that includes a repeating structure of a plurality of unique feature types and a plurality of markers distributed in the projected structured light pattern, where an epipolar distance between any two epipolar lines which are associated with an appearance in the image of any two respective markers is greater than a distance between any two distinguishable epipolar lines. The sensor is configured to capture an image of a reflected portion of the projected structured light. The calibration module is configured to determine an epipolar field for the active triangulation setup according to locations of the markers in the image, and to calibrate the active triangulation setup.

42 Claims, 11 Drawing Sheets

```
1310 — MaxSet= Ø;
1320 — For num_iteration = 1:MAX_NUM_ITERATIONS
       {
       1325 — Randomly select a minimal set of detected anchors MinSet;
       1330 — Match MinSet to projected markers;
       1335 — Estimate TestFM;
       1340 — Calculate anchors Epipolar lines in the image plane;
       1345 — Find all detected anchors lying on the calculated lines (TestSet);
       1350 — If (#TestSet > #MaxSet)
              {
              1355 — MaxSet ←TestSet;
              1360 — FM ←TestFM;
              }
       }
```

ACTIVE TRIANGULATION CALIBRATION

RELATED APPLICATIONS

This application claims priority to U.S. Provisional Application Ser. No. 62/016,278 filed Jun. 24, 2014, and further claims priority to U.S. Provisional Application Ser. No. 62/087,845 filed Dec. 5, 2014, both of which are incorporated herein by reference.

BACKGROUND

Active triangulation technology may rely upon matching, using an epipolar constraint, detected projected pattern features to features in the original pattern that was projected onto an imaged scene. A straightforward way to do that is to detect a pattern feature in an image of a reflected portion of a projected structured light pattern, use a stereo set of calibration parameters, estimate the corresponding Epipolar line through the projector plane, find a corresponding feature on (or closest to) the line (in the projected structured light pattern), and triangulate to find 3D coordinates of the feature again, using the calibration parameters.

This strategy works well as long as the system's calibration is intact. Environmental changes as well as mechanical shocks and strains influence both intrinsic and extrinsic calibration parameters. As a result, estimated Epipolar lines are incorrect, which leads in turn to faulty feature matching. Epipolar mismatches have much stronger impact on a resulting point cloud than triangulation errors. The latter produce a distorted point cloud, with degree of distortion depending smoothly on the calibration errors. The former, however, can result in complete and abrupt disintegration of the point cloud.

SUMMARY

There is provided according to an aspect of the presently disclosed subject matter a calibration unit for an active triangulation setup. According to examples of the presently disclosed subject matter, the calibration unit includes a memory and a processor. The memory can be configured to store an image of a reflected portion of a projected structured light pattern that is comprised of a repeating structure of a plurality of unique feature types. The memory can be further configured to store locations on an image plane of a plurality of distinguishable epipolar lines that are associated with a respective plurality feature types from said plurality of unique feature types, and locations on the image plane of epipolar lines which are associated with an appearance in the image of a respective plurality of markers which are included in the projected structured light pattern. An epipolar distance between any two epipolar lines which are associated with an appearance in the image of any two respective markers from said plurality of markers is greater than a distance between any two distinguishable epipolar lines. The processor can be configured to determine an epipolar field for the active triangulation setup according to locations of the markers in the image and locations of matching markers in the projected structured light pattern.

There is provided in accordance with a further aspect of the presently disclosed subject matter an active triangulation system. According to examples of the presently disclosed subject matter, the system can include an active triangulation setup and a calibration module. The active triangulation setup can include a projector and a sensor. The projector can be configured to project a structured light pattern that is comprised of a repeating structure of a plurality of unique feature types a plurality of markers distributed in the projected structured light pattern such that an epipolar distance between any two epipolar lines which are associated with an appearance in the image of any two respective markers from said plurality of markers is greater than a distance between any two distinguishable epipolar lines. The sensor can be configured to capture an image of a reflected portion of the projected structured light. The calibration module can be configured to determine an epipolar field for the active triangulation setup according to locations of the markers in the image and locations of matching markers in the projected structured light pattern, and to calibrate the active triangulation setup utilizing the determined epipolar field.

In accordance with yet a further aspect of the presently disclosed subject matter, there is provided a method of calibrating an active triangulation setup. According to examples of the presently disclosed subject matter, the method can include: obtaining an image of a reflected portion of a projected structured light pattern that is comprised of a repeating structure of a plurality of unique feature types, and wherein the projected structured light pattern comprises a plurality of markers distributed in the projected structured light pattern such that an epipolar distance between any two epipolar lines which are associated with an appearance in the image of any two respective markers from said plurality of markers is greater than a distance between any two distinguishable epipolar lines; determining an epipolar field for the active triangulation setup according to locations of the markers in the image and locations of matching markers in the projected structured light pattern; and calibrating the active triangulation setup utilizing the determined epipolar field.

Figure 1:
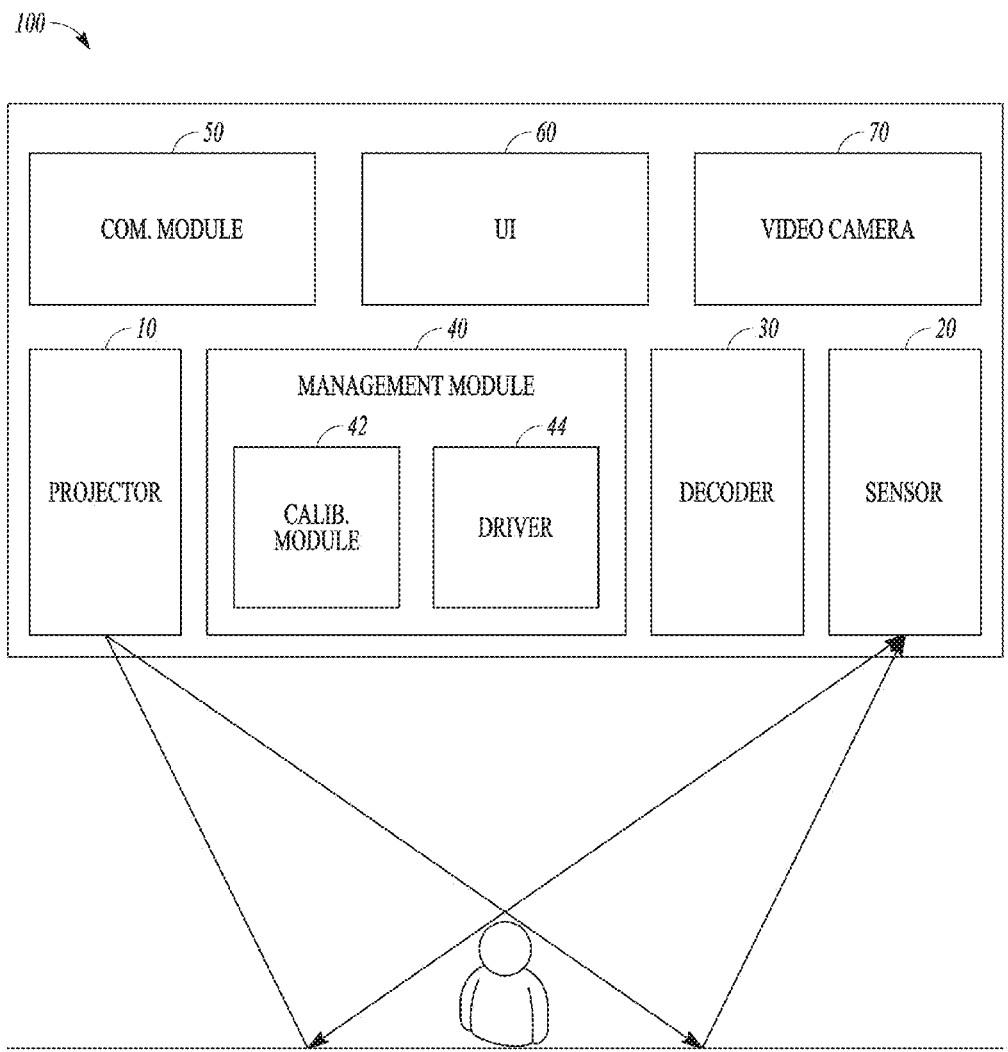
FIG. 1 is a block diagram illustration of an active triangulation system, according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

GENERAL DESCRIPTION

In the following description, reference is made to the accompanying drawings that form a part hereof, and in which there is shown by way of illustration specific embodiments which may be practiced. These embodiments are described in sufficient detail to enable those skilled in the art to practice the invention, and it is to be understood that other embodiments which arise with sufficient certainty from the description may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software, hardware or a combination of software hardware. The software may include computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

According to an aspect of the presently disclosed subject matter there is provided a method of calibrating an active triangulation setup. According to examples of the presently disclosed subject the method can include: obtaining an image of a reflected portion of a projected structured light pattern that is comprised of a repeating structure of a plurality of unique feature types, wherein the active triangulation setup and the repeating structure of the plurality of unique feature types impart a constraint that any feature type appears at most once along any one of a plurality of distinguishable epipolar lines, and wherein the projected structured light pattern comprises a plurality of markers distributed such that an epipolar distance between any two epipolar lines which are associated with an appearance in the image of any two respective markers from said plurality of markers is greater than a distance between any two distinguishable epipolar lines; when a calibration error causes an epipolar matching error that is in an extent that is greater than the distance between distinguishable epipolar lines but is less than the distance between epipolar lines which are associated with an appearance in the image of respective markers, determining an epipolar field for the active triangulation setup according to locations of the markers in the image and locations of matching markers in the projected structured light pattern; and calibrating the active triangulation setup utilizing the determined epipolar field.

In the description and in the claims, the terms "image" and "frames" are used with a similar meaning. Examples of the presently disclosed subject matter relate to fundamental matrix estimation that is based on the processing of a single image of a reflected portion of a projected structured light pattern. Other examples of the presently disclosed subject matter relate to a fundamental matrix estimation that is based on the processing of a plurality of frames which capture a dynamic scene where from a projected structured light pattern is projected. It would be appreciated that the fundamental matrix estimation method described herein with reference to an image can be applied to a single frame of a video sequence, and that the terms image and frame can be interchanged.

Referring now to FIG. 1 there is shown a block diagram illustration of an active triangulation system, capable of capturing depth information, according to examples of the presently disclosed subject matter. The active triangulation system 100 shown in FIG. 1 uses active triangulation technology to obtain depth information. For illustration purposes, the active triangulation system 100 is shown as being integrated into a general purpose mobile computing platform, such as a smartphone, and includes additional components which are optional.

The active triangulation system 100 includes a projector 10, and sensor 20, a decoder 30 and a calibration module 42.

An example of an active triangulation system is the project Tango tablet by Google of Mountain View, Calif., United States of America, which had two versions, one of which incorporated structured light depth sensing technology, and another was based on Time of Flight.

According to examples of the presently disclosed subject matter, the projector 10 is a structured light projector. The projector 10 can be configured to project a structured light pattern onto a scene. An example of a structured light projector which can be used in examples of the presently disclosed subject matter is described in US Patent Publication No. 2013/0250066 to Abraham, which is hereby incorporated by reference in its entirety. An examples of a pattern which may be used in a structured light projector in accordance with examples of the presently disclosed subject matter, is disclosed in U.S. Pat. No. 8,538,166 to Gordon et al., and in U.S. Pat. No. 8,090,194 to Gordon et al., which are hereby incorporated by reference in their entirety. Optionally, the projector 10 can be configured to operate at a wavelength (or wavelength band) which is invisible to humans.

The sensor 20 is capable of capturing an image (still or video) of a reflected portion of the structured light projected by the projector 10. The projected structured light is reflected off of objects, and the light which bounces back from objects in the scene is detected by the sensor 20 and is translated to electronic signals, which are in turn translated into a digital image. The sensor 20 can be configured to operate at a wavelength which matches or corresponds to the wavelength at which the projector 10 operates and can be time synchronized or coordinated with the projector 10. The aforementioned project Tango device incorporate such a sensor and this sensor is an example of a sensor that can be used in the active triangulation system 100.

In the present disclosure and in the claims the term active triangulation setup is used to describe a setup that includes at least one active source of illumination and at least one imaging sensor that is positioned apart from the active source of illumination and is used to capture an image of a reflected portion of the illumination. Active triangulation methods are used to extract depth information from a captured image(s) of the reflected portion of the illumination according to calibration information of the active triangulation setup. The calibration information is based on intrinsic and extrinsic parameters of the active triangulation setup, such as the epipolar geometry of the setup (e.g., the fundamental matrix). It would be noted that while some examples of the presently disclosed subject matter relate to the case where an active triangulation setup in respect of which a calibration procedure is implemented has a single illumination source (projector) and a single sensor, this active stereo setup is provided as an example only, and the calibration procedure can readily be applied by those versed in the art to active triangulation setups which include more than one illumination source and/or more than one sensor. For example, the calibration procedure described herein can be applied to an assisted stereo active triangulation setup. Some details with regard to an example of an assisted stereo depth sensing method are disclosed in U.S. Pat. No. 8,538,166 to Gordon et al., and in U.S. Pat. No. 8,090,194 to Gordon et al. It would be further appreciated that a nearly single optical path (SOP) setup is considered to be within the scope of the term "active triangulation setup", and specifically a SOP active triangulation setup is considered to be a setup where the active source of illumination and imaging sensor are positioned apart from one another (although they are close apart).

The projected structured light typically embodies a structured light pattern. There are various known structured light patterns in the art. Examples of structured light patterns include the ones used in the aforementioned devices, and the patterns and patterning methods described in U.S. Pat. No. 8,538,166 to Gordon et al., and in U.S. Pat. No. 8,090,194 to Gordon et al. The structured light pattern includes a plurality of unique feature types. Optionally, each one of the plurality of unique feature types is characterized by a unique combination of spatial formations.

Optionally, the projected structured light pattern includes a repeating structure of a plurality of unique feature types. The active triangulation setup and the repeating structure of the plurality of unique feature types impart a constraint that any feature type appears at most once along any one of a plurality of distinguishable epipolar lines. An example of a repeating structure of a plurality of unique feature types, a discussion of the epipolar constraint and a description of distinguishable epipolar lines can be found, for example, in U.S. Pat. No. 8,538,166 to Gordon et al., and in U.S. Pat. No. 8,090,194 to Gordon et al. Optionally, the repeating structure of a plurality of unique feature types is a periodic structure. Further by way of example, the repeating structure of a plurality of unique feature types is a quasi-periodic structure. Optionally, the repeating structure of the plurality of unique feature types embodies a coding matrix. Optionally, the repeating structure of the plurality of feature types is a tile.

According to examples of the presently disclosed subject matter, the projected structure light pattern includes markers. The term "marker" as used in the present description and in the claims refers to a pattern feature that is distinguishable from non-marker feature types, and which can be identified (as a marker) and located within an image of a reflected portion of a projected structured light pattern in which the marker is included. It would be appreciated that under various operating conditions, and optical scenarios and environments, some degree of false positive and false negatives with regard to marker detection, as well as localization errors, should be expected. Such errors should be taken into account when considering the above definition of the term marker and when reading various the examples of the presently disclosed subject matter. Optionally, the markers are included in the projected pattern and are distributed according to predefined rules. Examples of markers which can be used in examples of the presently disclosed subject matter are described in U.S. Provisional Patent Application No. 62/087,845 which is hereby incorporated by reference in its entirety.

Optionally, the markers can have a spatial formation which is a modification of the unique spatial formation which characterizes a corresponding feature type. In further examples, the projected structured light pattern includes a plurality of feature types, and each one of the plurality feature types serves as a codeword. Each feature type can be formed by a unique combination of feature elements, and each one of the markers can include one or more pairs of feature elements between which the epipolar distances are modified relative to distances between respective feature elements in non-marker areas of said pattern. More details with respect to markers and with respect to possible modifications that can be applied to feature types in order to obtain markers are also disclosed in U.S. Provisional Patent Application No. 62/087,845. U.S. Provisional Patent Application No. 62/087,845.

The term "epipolar distance" as used throughout the description and in the claims, means, in a rectified triangulation setup (e.g., an active triangulation setup), a distance between epipolar lines. It would be noted, that in a rectified triangulation setup the epipolar field consists of parallel epipolar lines, and therefore the distance between any given pair of epipolar lines is constant. In the following description and in the claims, epipolar line are associated with pattern features (e.g., markers, feature types or feature elements), and while the Euclidean distance between a given pair of pattern features may vary (e.g., as a function of a reflection distance) the epipolar distance remains constant in a rectified system. It would be appreciated by a person skilled in the art, that a non-rectified triangulation setup can be rectified using known algorithms, and that examples of the presently disclosed subject matter also relate to such non-rectified triangulation setups, and that the terms epipolar distance in such implementation means the distance between epipolar lines post rectification. It would be that a non-rectified triangulation setup can be rectified to a sufficient degree, even when the triangulation setup is off-calibrated to an extent and in a manner which matches to type and extent of calibration errors which examples of the presently disclosed subject matter are capable of correcting.

U.S. Provisional Patent Application No. 62/087,845 also provides details and examples with regard to detection of markers in an image of a reflected portion of a projected structured light which includes feature types and markers (and for distinguishing markers from feature types), and with respect to decoding of an image of reflected portion of a projected structured light which includes feature types and markers. It would be noted that the markers and methods described in U.S. Provisional Patent Application No. 62/087,845, provide markers which can be both distinguished from non-modified feature types (and thus detectable as markers) and yet are recognized by the decoder and thus would successfully pass the decoding process and be assigned with the codeword value of the corresponding feature type. It would also be appreciated that this type of markers can be used in relatively large numbers, since they do not come at the expense of coverage and/or resolution of the pattern in which they are used. Optionally, the markers do not break the pattern's grid connectivity. According to examples of the presently disclosed subject matter, a feature type to marker modification procedure or a marker generation procedure, or a modification mask or any other modification tool or function, which may be used to generate the markers and or to modify feature types to markers, are designed to maintain the pattern's grid connectivity. Examples of modification processes and of markers generated by such processes are provided in Provisional Patent Application No. 62/087,845.

According to examples of the presently disclosed subject matter, the distribution of the markers within the pattern is such that a distance between any two epipolar lines which are associated with an appearance in the image of any two respective markers is greater than a distance between any two distinguishable epipolar lines (including a nearest pair of distinguishable epipolar lines which are each associated with an appearance of the same feature type). As mentioned above, in some examples of the presently disclosed subject matter, the projected structured light pattern includes a repeating structure of a plurality of unique feature types. The active triangulation setup and the repeating structure of the plurality of unique feature types impart a constraint that any feature type appears at most once along any one of a plurality of distinguishable epipolar lines. The term "distinguishable epipolar line" refers to the epipolar line which is associated with an appearance of a certain feature type (in an image of a reflected portion of the projected structured light pattern), and in accordance with examples of the presently disclosed subject matter, this line is distinguishable from the epipolar line that is associated with any other appearance in the image of the same feature type. It would be appreciated that two or more repetitions of any feature type may appear on a distinguishable epipolar line, but within any given section of an epipolar line which corresponds to an operating range of the respective active triangulation setup, any feature type will appear at most once along the epipolar line. In this regard, the constraint that any feature type appears at most once along any one of a plurality of distinguishable epipolar lines is applied in respect of each one or more sections of a respective epipolar line which correspond to an operating range of the respective active triangulation setup.

Various patterning elements can be used to generate the projected pattern, including a transmissive mask and a diffractive optical element, for example. The patterning element can be incorporated into the projector 10.

The image of the reflected portion of the projected structured light can be processed to extract depth information from the image. The processing of the image can include a decoding procedure, which can be implemented by the decoder 30 in FIG. 1. The decoding procedure is used to translate the visual information appearing in the image into corresponding codewords and by applying a triangulation method, depth information can be obtained. U.S. Pat. No. 8,538,166 to Gordon et al., and in U.S. Pat. No. 8,090,194 to Gordon et al., provide an example of a coding procedure that can be implemented as part of examples of the presently disclosed subject matter. Other decoding procedures are known to those versed in the art.

The calibration module 42, is shown in FIG. 1 by way of illustration as being part of a management module 40. The calibration module 42 is configured to implement a calibration procedure and use the calibration procedure to estimate and remediate calibration errors, as will be described in greater detail below. The calibration module 42 can be configured to determine an epipolar field for the active triangulation setup according to locations of markers in an image of a reflected portion of the projected structured light, and can be configured to determine locations of matching markers in the projected structured light pattern, as part of the calibration procedure. Optionally, when a calibration error causes an epipolar matching error that is in an extent that is greater than the distance between distinguishable epipolar lines but is less than the distance between epipolar lines which are associated with an appearance in the image of respective markers, the calibration module 42 can be configured to determine an epipolar field for the active triangulation setup according to locations of the markers in the image and locations of matching markers in the projected structured light pattern, and the calibration module is configured to calibrate the active triangulation setup using the determined epipolar field.

It would be appreciated that the calibration module 42 can be configured to implement additional calibration operations and procedures, including calibration procedures which utilize special calibration setups and aids, and processes which are aimed at achieving Euclidean calibration (as compared to epipolar field estimation based calibration). Various calibration procedures can be added to and integrated with the epipolar field estimation based calibration according to examples of the presently disclosed subject matter, or the epipolar field estimation based calibration according to examples of the presently disclosed subject matter can be implemented as an independent procedure, and additional calibration procedure can be implemented separately.

A driver 44 is also shown in FIG. 1, as part of the management module 40. The driver 44 can be configured to control certain aspects of the operation of the projector module 10, for example, controlling pulse width of the projector's 10 light source, controlling the current which is fed to the projector's 10 light source, etc. The driver 44 can also be used to control the operation of the sensor 20, for example, the exposure timing and the exposure duration etc.

Optionally, the system 100 may also include an imaging module, such as a video camera 70, which is capable of generating visible light images or videos (in digital format). The management module 40 can be configured to control various aspects of the operation of the imaging module. The image or video data can be co-processed with the depth information in a manner known per-se. The imaging module and the sensor 20 can be co-calibrated.

Optionally, the system 100 can also include a communication module 50. The communication module 50 can communicatively couple the system 100 with external nodes or devices. The communication module 50 can support wireless and/or wired communication. The system 100 can send and/or receive instructions and/or data over through the communication module 50. The system 100 can be distributed across several (e.g., two or more) communicatively coupled devices, and certain operations can be implemented in a distributed manner over such two or more devices. For example, gird computing or cloud technology can be used to process information as part of the calibration error estimation procedure that is described herein.

The system 100 can also include a user interface 60, such as a display, a touchscreen, speakers, a microphone, etc. to enable interaction with a user/operator. For example, the operator can utilize the user interface 60, to activate the system 100 and to generate depth information using the active triangulation setup and other components of the system 100.

Figure 2:
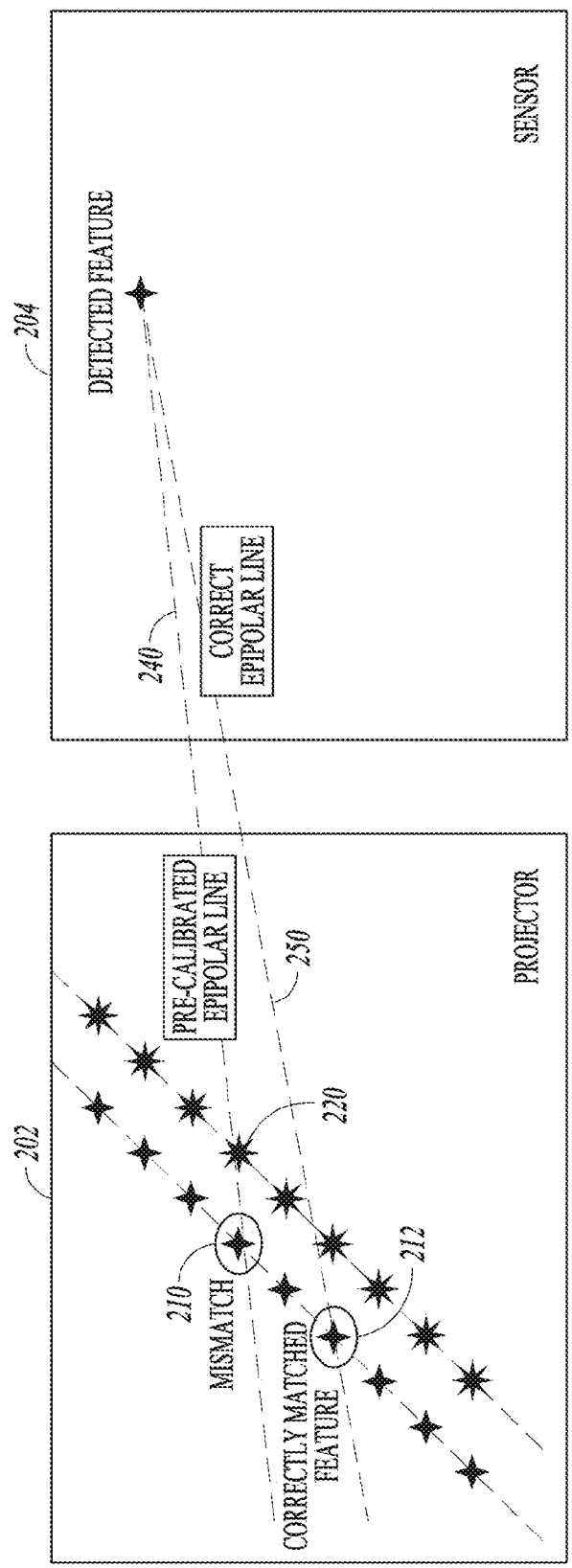
FIG. 2 is a graphical illustration of effect of epipolar mismatches on a resulting point that was generated using a fundamental matrix which embodies such epipolar mismatches.

As mentioned above, in order to extract depth information using an active triangulation setup, projected pattern feature types are detected in a captured image and are matched, using epipolar constraints, to respective feature types in the original pattern that was projected onto the imaged scene. Epipolar mismatches have much stronger impact on a resulting point cloud than triangulation errors. See for example FIG. 2, where there is shown a graphical illustration of an epipolar mismatch scenario. In FIG. 2, part of a simplified example of a structured light pattern that is projected by a projector 202 is shown. In particular, a segment of the projected structured light pattern that includes a first kind of feature types, namely four point stars represented here by feature elements 210 and 212, and a second kind of feature types, namely six point stars represented here by feature type 220. An image 204 of a reflected portion of the projected structured light pattern is acquired by a sensor of an active triangulation system (object 204 may refer to a segment of the image). An appearance of a feature type 230 is identified at a certain location in the image. An epipolar line 240 for the identified appearance of the feature type 230 is determined, and a corresponding feature type 210 on the line 240 (or a feature that is closest to the line) is found. Triangulation is then used to compute 3D coordinates for the corresponding location in the image, using calibration parameters. As can be seen in FIG. 2, when the calibration parameters are incorrect, the estimated epipolar lines can be incorrect, which in turn results in faulty feature matching. In the scenario shown in FIG. 2, the correct epipolar line for feature type 230 is epipolar line 250, and its corresponding feature is feature type 212, and not feature type 210.

Triangulation errors can produce a distorted point cloud (or any distort depth information in other forms), and the degree of distortion depends at least in part on the calibration errors. Calibration errors, however, can result in complete and abrupt disintegration of the point cloud.

Figure 3A:
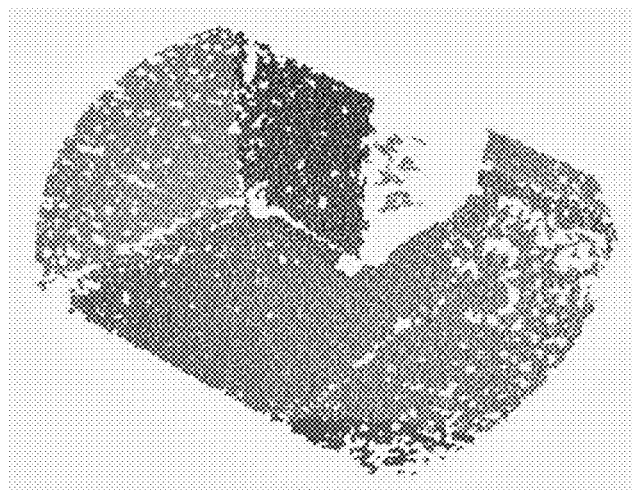
FIGS. 3A, 3B and 3C are graphical illustration of differences between a point cloud produced using a properly calibrated active triangulation setup (FIG. 3A), a disintegrated point cloud that was produced by an off-calibrated active triangulation setup (FIG. 3B), and a point cloud that was produced by the same off-calibrated active triangulation setup of FIG. 3B, but following an estimation of the fundamental matrix using a method in accordance with examples of the presently disclosed subject matter (FIG. 3C)
Figure 3B:
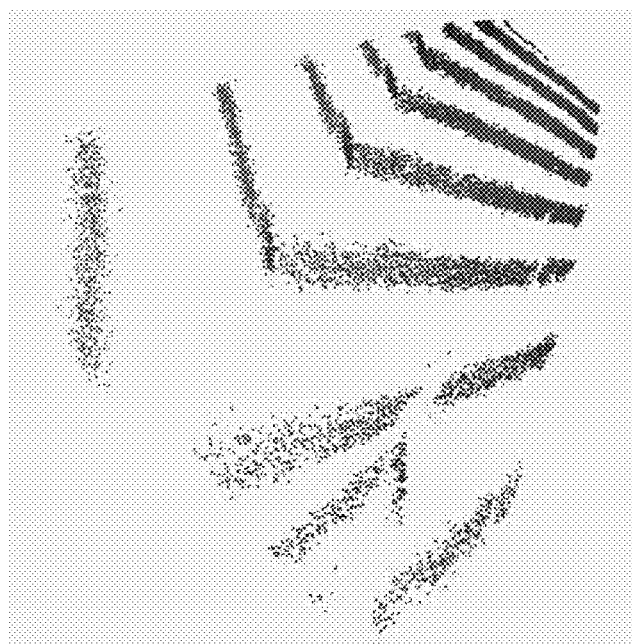
Figure 3C:
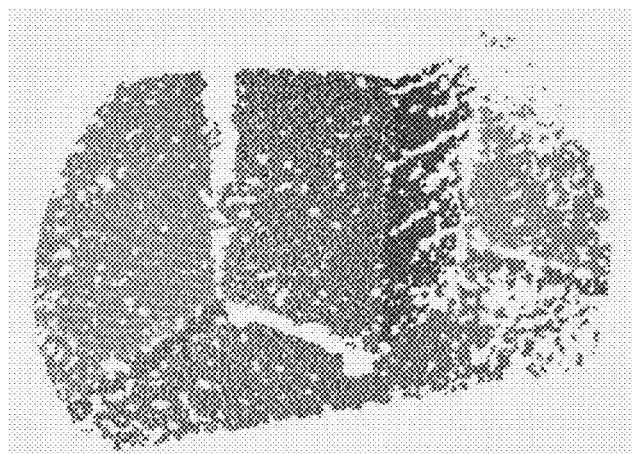

FIGS. 3A-3C illustrate differences between a point cloud produced using a properly calibrated active triangulation setup (FIG. 3A), a disintegrated point cloud that was produced by an off-calibrated active triangulation setup (FIG. 3B), and a point cloud that was produced by the same off-calibrated active triangulation setup of FIG. 3B, but following an estimation of the fundamental matrix using a method in accordance with examples of the presently disclosed subject matter (FIG. 3C). As can be seen, the point cloud in FIG. 3C does show some triangulation errors compared to the point cloud in FIG. 3A ("the ground truth", but the point cloud provides a projective reconstruction of the imaged object (as opposed to the disintegrated point cloud in FIG. 3B).

Using markers in a projected pattern, together with the calibration procedure according to examples of the presently disclosed subject matter, to estimate a fundamental matrix for a single image or multiple frames can eliminate critical dependence of the epipolar matching operation on the calibration parameters.

For such markers detected with camera coordinates $x_i$, the corresponding Epipolar line parameters $l_i$ are given by:

$$l_i = Fx_i, \quad \text{(Formula 1)}$$

where F is the Fundamental Matrix (FM) of the triangulation setup. As will be explained here in detail, estimating F by using markers embedded in the projected structured light pattern can be used to reduce epipolar mismatches and allow an off-calibrated active triangulation setup (such as is used in a depth sensing device, a 3D camera etc.) to provide a projective reconstruction of the imaged scene, despite being off-calibrated. In one embodiment, eight or more correctly matched pattern features, or as is suggested here—markers, can suffice for achieving a projective reconstruction. For example, Hartley, Richard, and Andrew Zisserman. Multiple view geometry in computer vision. Cambridge university press, 2003, describes various aspects of 3D vision and reconstruction, and in particular the eight point algorithm referenced here.

Figure 4:
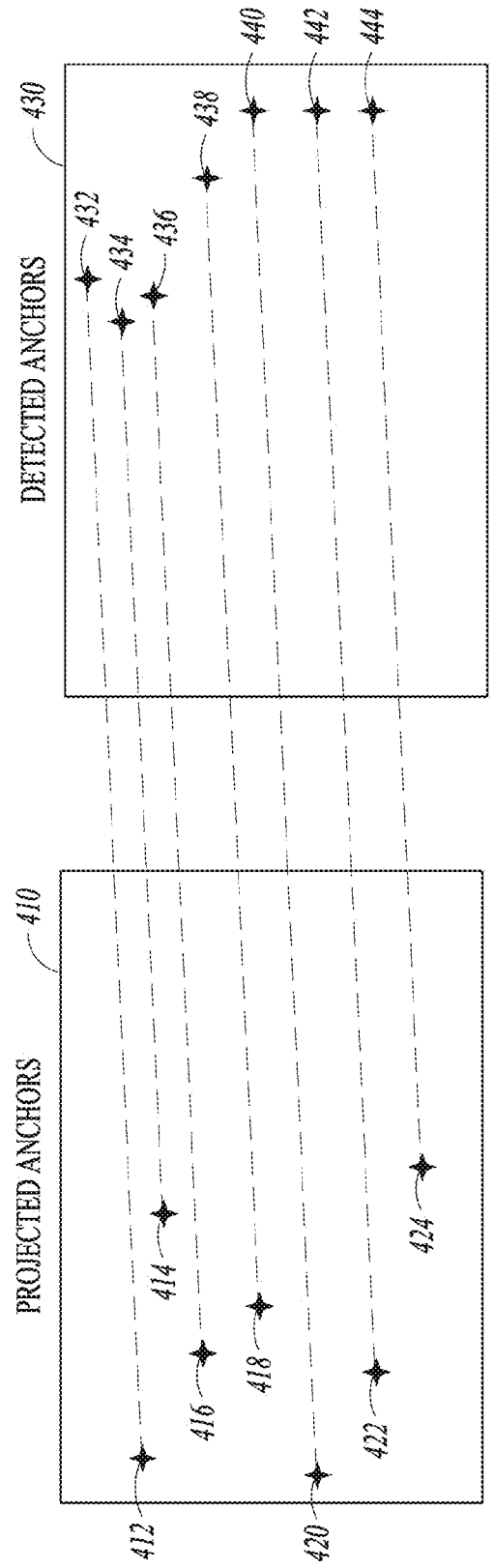
FIG. 4 is a graphical illustration of "special" pattern features referred to as markers embedded in a projected structured light pattern (not shown) and distributed according to predefined rules, in accordance with examples of the presently disclosed subject matter.

In one embodiment as illustrated in FIG. 4, "special" pattern features referred to as markers are planted or embedded in the projected structured light pattern 410 and distributed according to predefined rules. In the example shown in FIG. 4, and according to examples of the presently disclosed subject matter, features indicated at 412, 414, 416, 418, 420, 422, and 424 are slightly distorted versions of certain feature types, referred to herein as markers. As will be described in further details below, the markers have a modified appearance relative to respective feature types (which are not modified), so that they can be discernible from the counterpart non-modified feature types and for other feature types of the projected structured light pattern. In an image 430 of a reflected portion of the projected structured light pattern 410, the detected markers, correspondingly indicated at 432, 434, 446, 438, 440, 442, and 444, are matched to their projected counterparts 412, 414, 416, 418, 420, 422, and 424 in the projected pattern. Optionally, predefined distribution rules of the markers can be used to match the detected markers 432, 434, 446, 438, 440, 442, and 444 to their projected counterparts 412, 414, 416, 418, 420, 422, and 424. It would be appreciated, that it is possible that only some of the projected markers would be detected in the image, and thus the matching operation can be carried out only for a subset of the markers, namely the ones which were successfully detected (in the image).

According to examples of the presently disclosed subject matter, the matching pairs of markers can be used to estimate a fundamental matrix for the active triangulation setup.

Optionally, the markers can be configured such that while the markers are detectable and distinguishable from their non-modified feature type counterparts, they are also decodable, meaning that, on the one hand a processor running a marker detection procedure is capable of identifying a marker within the projected pattern and the processor can distinguish the detected marker from non-modified feature types (non-markers), and on the other hand a decoder that is configured and used to decode the projected structured light pattern is able to successfully decode the markers, and assign to each marker the code word which is associated with the feature type on which that marker is based (e.g., the feature type that was modified to create the marker).

It would be noted, that the exact configuration of the modification function or procedure or utility or rule, which may be used to modify certain feature types of the pattern to provide the markers, can depend on several factors, including for example, a tolerance of the decoder, optical properties of the imaged scene, properties of the projected pattern, properties of the projection and/or imaging equipment, etc. Further details with regard to the markers, the relation between a marker and a corresponding feature type, the detection of the markers, and the decoding of a pattern that includes markers are described in U.S. Provisional Patent Application No. 62/087,845, which was incorporated by reference in its entirety in to the present application.

Figure 5:
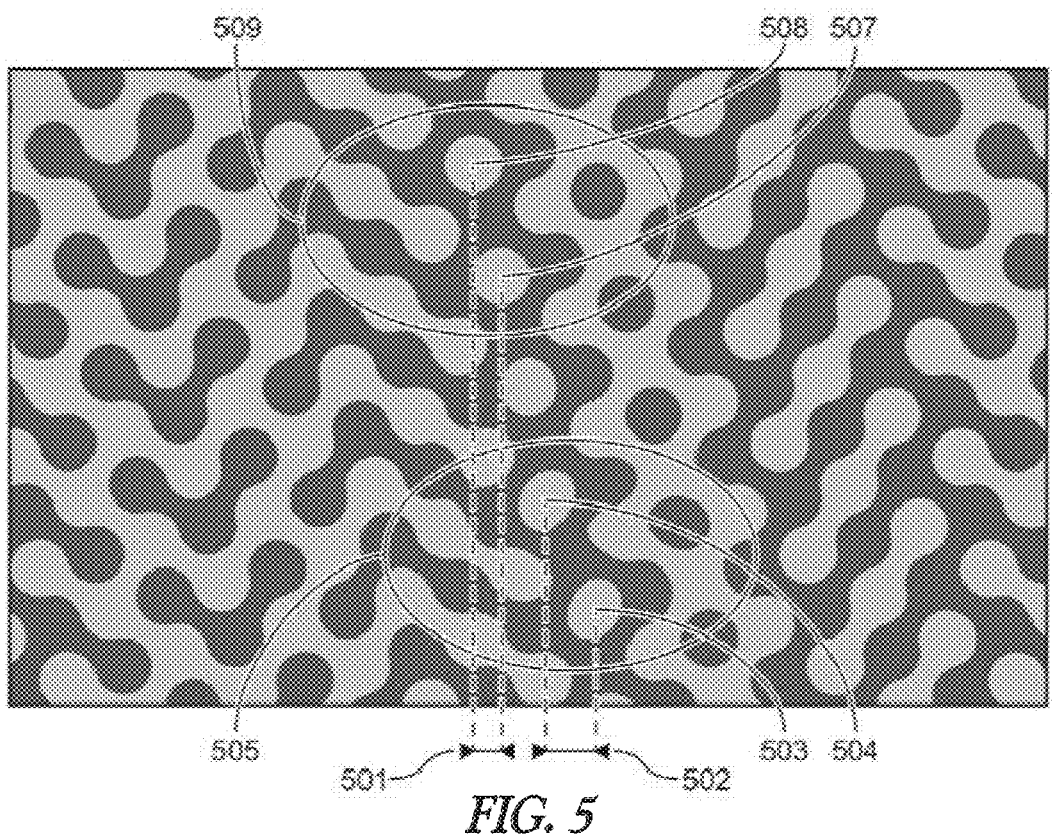
FIG. 5 is a graphical illustration of a bi-dimensional bi-tonal structure light pattern including a marker created using a twirl type distortion, according to examples of the presently disclosed subject matter.
Figure 6:
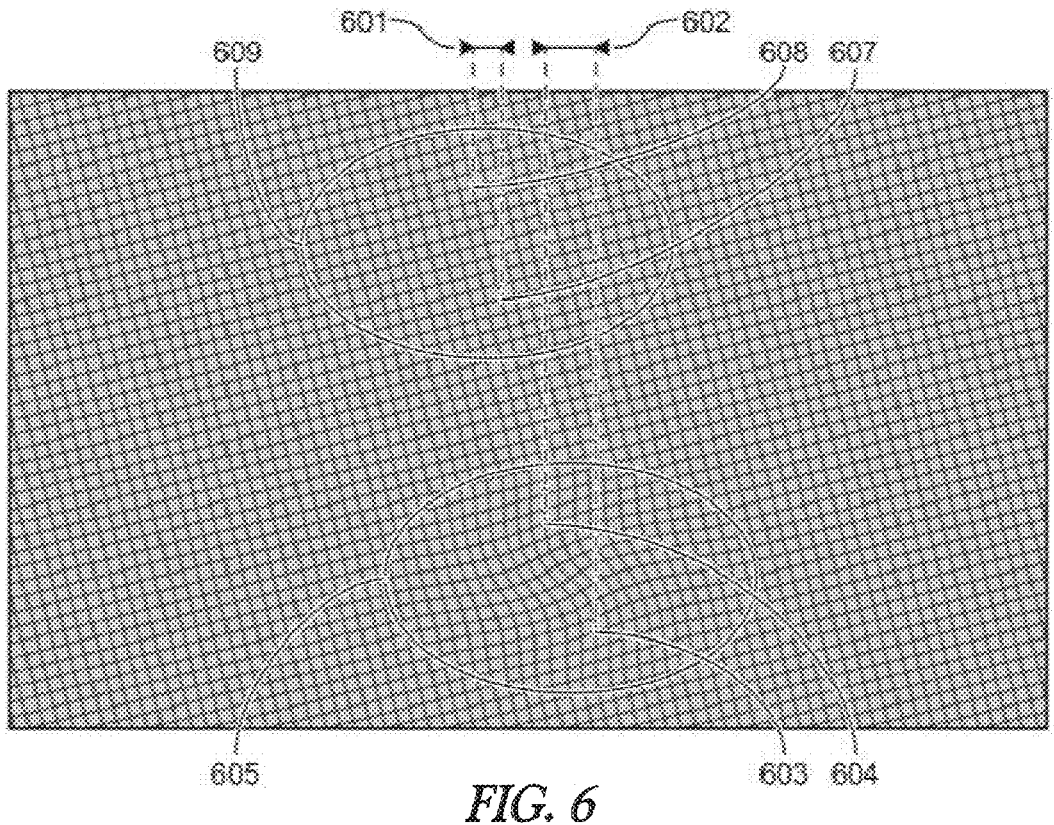
FIG. 6 is an illustration of a grid having a distortion that is similar to the twirl type distortion applied to the pattern of FIG. 5, according to examples of the presently disclosed subject matter.

FIG. 5 to which reference is now made, illustrates a bi-dimensional bitonal structure light pattern including a marker created using a twirl type distortion, according to examples of the presently disclosed subject matter. Additional reference is made to FIG. 6, which is a grid having a distortion that is similar to the twirl type distortion applied to the pattern of FIG. 5, according to examples of the presently disclosed subject matter. FIG. 5 shows an example of a bi-dimensional coded pattern that is comprised of a plurality of feature types, where each feature type is comprised of a unique combination of a plurality of feature elements. Each one of the feature elements that are used to construct a feature type has a predefined shape and dimensions. FIG. 6 is provided as a non-limiting visual aid which shows another view of the distortion that was applied within a distortion area 505 in FIG. 5 as compared to a non-modified area 509. The areas corresponding to the distortion area 505 and the non-modified area 509 in FIG. 5 are marked 605 and 609, respectively, in FIG. 6.

The coded pattern shown in FIG. 5 can be used to provide a structured light pattern in an active triangulation setup. In such an active triangulation setup, a projector is used to project the structured light pattern. The structured light pattern or some portion thereof is reflected off one or more objects, and a sensor is used to capture an image of the reflected portion of the projected structured light pattern. The projector-sensor relation creates epipolar geometry. Having a fixed relative position between the projector and the sensor imparts a geometric constraint which restricts the location of any given reflected feature type (and any feature element) in the captured image to a unique epipolar line in the captured image. This geometric constraint and the structure of the pattern determines the epipolar distances between distinguishable epipolar lines. However, some examples of the presently disclosed subject matter can also be used with non-fixed projector-sensor configurations.

In FIG. 5, the bi-dimensional coded pattern is orientated at a certain angle relative to the epipolar field. Discussion of the coding method and further discussion with regard to the orientation of the code relative to the epipolar field is described for example in U.S. Pat. Nos. 8,090,194 and 8,538,166. However, it should be noted that the examples provided herein including with regard to a method of generating markers are not limited to a code that is orientated relative to the epipolar field, and can also be applied to a code that is arranged in various other forms (relative to the epipolar field), including with respect to a code that is aligned with the epipolar field, as long as the coding method provides equidistant feature elements or in a more generic implementation of examples of the presently disclosed subject matter, the method of generating markers is used with a code that has predefined distances between any given pair of feature elements.

According to examples of the presently disclosed subject matter, the markers are generated by modifying, within a certain area of the structured light pattern, the epipolar distances between a pair (or pairs) of feature elements. The extent of modification of the epipolar distances can be determined by a preset epipolar distance modification range that is used in the marker detection process and is within a tolerance that is implemented in the decoding process. Thus, the markers can be identified as such by the marker identification process, but would not lead to incorrect classification of the feature type effected by the modification. For example, the extent of change is determined according to a certain noise level value, which represent an expected, evaluated or measured level of noise in the active triangulation setup or in a range imaging system which incorporates or uses the active triangulation setup, and the modification may be greater than a change caused by a noisy signal (at least to some degree or within an acceptable error rate). In this regard, some examples of the presently disclosed subject matter use a predefined distortion value which reflects an expected or estimated level of noise in a captured image of a reflected portion of the projected structured light pattern, and the modification is selected and/or controlled such that it exceeds, and is possibly distanced away by some margin, from the distortion value. According to examples of the presently disclosed subject matter, the predefined distortion value can be associated with (but is not necessarily bound by) the system's depth of field or with the system's SNR behavior, in particular with the system's SNR profile within the system's FOV. It should be further appreciated that some errors in identification of markers can occur due to (high levels of) local noise and other reasons, but a careful tuning of the modification that is used to create the markers and distribution of a plurality of markers within the projected pattern can reduce the implication of such errors.

It would also be noted that the change within a certain distortion area can also effect the epipolar distances between feature elements located within the distortion area and feature elements located outside the distortion area, e.g., the epipolar distances between feature elements in the distortion area and feature elements just outside the distortion area can also be modified due to the distortion applied within the distortion area. In this regard, a term "marker area" can extend beyond the distortion area. A marker area can include feature elements which were not distorted, since the epipolar distance between feature elements outside the distortion area and feature elements within the distortion area can also be different than the epipolar distance between respective feature elements within a non-modified area. In one example of the presently disclosed subject matter, a marker area includes the distortion area and the feature elements at the outside boundary of the distortion area. For illustration, in FIG. 5, the feature elements at the outside boundary of the distortion area include the feature elements directly surrounding area 505.

In FIG. 5 there is shown a distortion area 505 and a non-modified area 509. Within the distortion area 505 a twirl distortion is applied. This distortion modifies the epipolar distances between some or all of the feature elements within the distortion area 505. For example, compare the original epipolar distance 501 between feature elements 507 and 508 within the non-modified area 509 and the modified epipolar distance 502 between respective feature elements 503 and 504 within the distortion area 505. A similar modification is shown in FIG. 6 between the original epipolar distance 601 between grid points 607 and 608 within the non-modified area 609 and the modified epipolar distance 602 between respective grid points 603 and 604 within the distortion area 605.

As part of examples of the presently disclosed subject matter, the marker detection process is configured to detect within an image of a projected structured light pattern appearances of feature elements whose epipolar distances are different from the epipolar distances between respective feature elements in the original pattern (e.g., greater or smaller by some value or factor).

Further by way of example, the change may be such that the modified appearance of the respective feature type or feature types is within the tolerances applied by the feature type identification process (which can be implemented as part of the decoder), and thus the modified feature elements would (generally) not corrupt the feature type with which they are associated (within the scope of the decoding process, and with some exceptions where the modification process does corrupt, despite the measures taken, the underlying feature type). In this regard, it would be appreciated that the decoding process involves identifying feature types and placing the feature types on predefined epipolar lines. Each feature type is associated with a unique formation of feature elements, and in order to identify feature types, the image is processed to determine feature elements locations. The feature elements of original feature types (non-marker feature types) have predefined epipolar distances, and marker feature types include feature elements whose epipolar distances are different from the epipolar distances of the feature elements of original feature types. However, while the epipolar distances of the feature elements of the marker feature types are modified, continuity of feature elements is maintained, including across different feature types, both within the distortion area and between feature types within the distortion area and non-modified feature types outside the distortion area (at the distortion area's edges).

Any suitable type of distortion manipulation and pattern may be used including, for example, pinching and twirling. Other examples of possible distortions include puckering and bloating. In one example, different modifications can be implemented to different areas of the pattern, for example, based on which feature detection procedure (decoding process is used), based on the area of the pattern where the marker appears, etc. For example, for marker areas which are associated with a first feature type, or with a certain cluster of feature types, a first type of distortion may be used, and for marker areas associated with a second feature type, or with a second cluster of feature types, a second type of distortion may be used.

Figure 7:
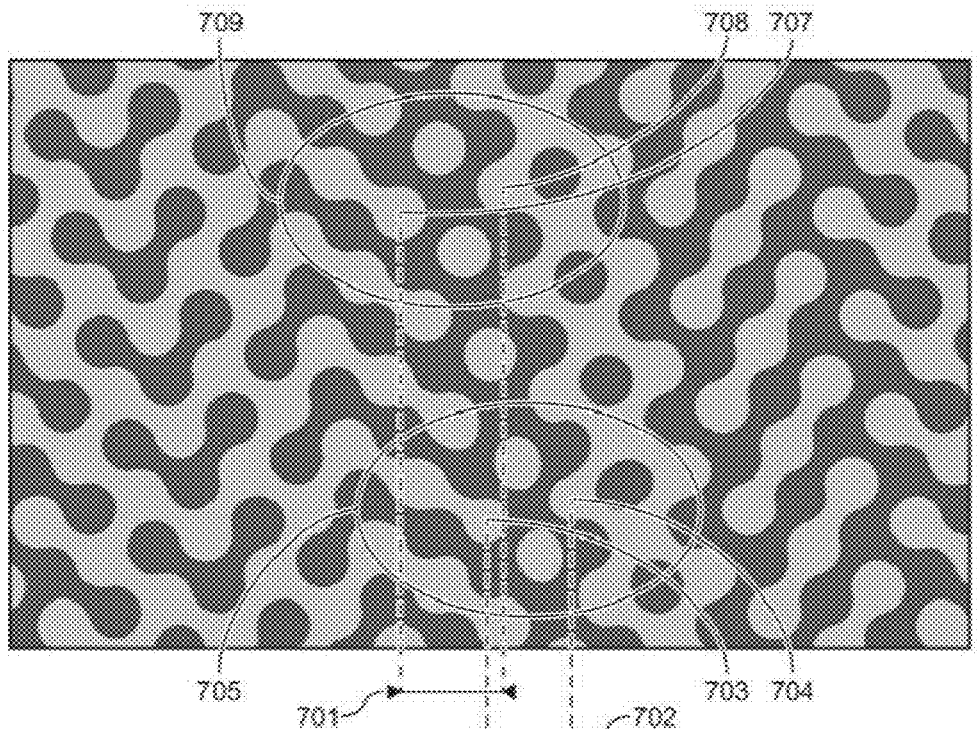
FIG. 7 is a graphical illustration of a bi-dimensional bi-tonal structure light pattern including marker created using a pinch type distortion, according to examples of the presently disclosed subject matter.
Figure 8:
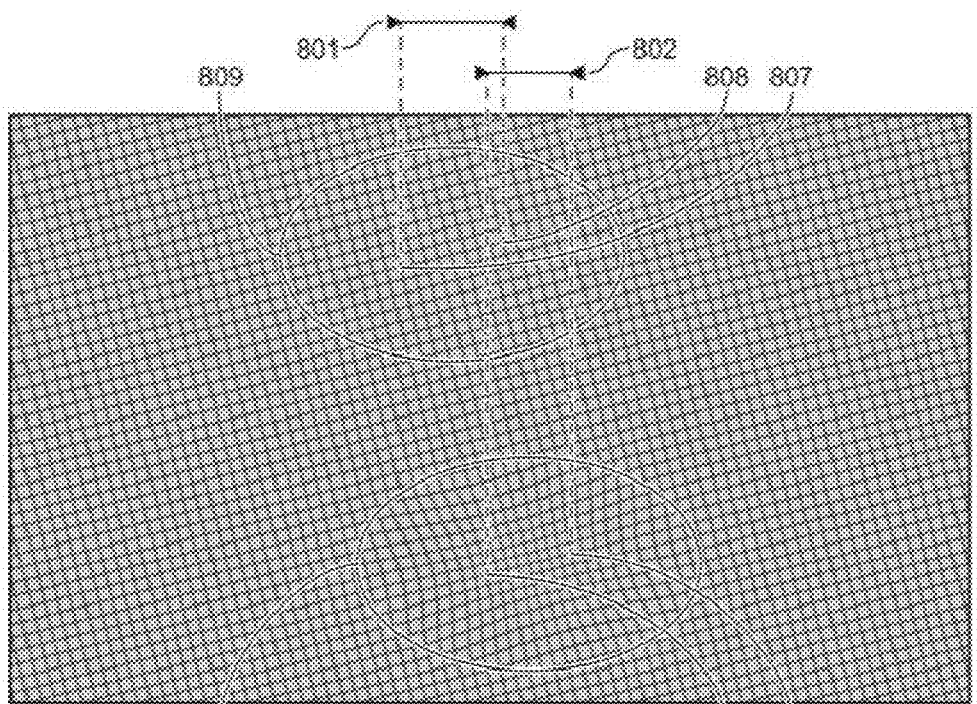
FIG. 8 is an illustration of a grid having a distortion that is similar to the pinch type distortion applied to the pattern of FIG. 7, according to examples of the presently disclosed subject matter.

As mentioned above, different types of distortions can be used in the marker areas. Reference is now made to FIG. 7 which illustrates a bi-dimensional bi-tonal structure light pattern including marker created using a pinch type distortion, according to examples of the presently disclosed subject matter. Additional reference is made to FIG. 8, which is a grid having a distortion that is similar to the pinch type distortion applied to the pattern of FIG. 7, according to examples of the presently disclosed subject matter. FIG. 7 shows an example of a bi-dimensional coded pattern identical to the code that was used in FIG. 5. FIG. 8 is provided as a non-limiting visual aid which shows another view of the distortion that was applied within a distortion area 705 in FIG. 7 as compared to a non-modified area 709. The areas corresponding to the distortion area 705 and the non-modified area 709 in FIG. 7 are marked 805 and 809, respectively, in FIG. 8.

In FIG. 7, within the distortion area 705 a pinch distortion is applied. This distortion modifies the epipolar distances between some or all of the feature elements within the distortion area 705. For example, compare the original epipolar distance 701 between feature elements 707 and 708 within the non-modified area 709 and the modified epipolar distance 702 between respective feature elements 703 and 704 within the distortion area 705. A similar modification is shown in FIG. 8 between the original epipolar distance 801 between grid points 807 and 808 within the non-modified area 809 and the modified epipolar distance 802 between respective grid points 803 and 804 within the distortion area 805.

It would be noted that by using markers which are decodable (or which maintain the feature types within the marker areas decodable), having many distortion areas in the code (the areas which are modified to create the markers) is possible with only a limited damage to or possibly even without significantly damaging the quality of depth information extractable from the projected pattern, because the markers are "transparent" to the decoding process which is capable of decoding the feature types within the marker areas. It would be appreciated that in order to maintain the decodability of the feature types within the markers the modification that is applied to the distortion areas (and to the marker areas) may be limited in its extent so as not to render the feature types within the marker areas un-decodable. For example, the modification of the epipolar distance should take into account the safe distance for epipolar line distinction, which was described for example in U.S. Pat. No. 8,090,194 to Gordon et al., and U.S. Pat. No. 8,538,166 to Gordon et al. If the epipolar distances between feature elements is modified too much, the feature types with which the feature elements are associated may no longer be identified by the decoder, or may be incorrectly placed on one of the distinguishable epipolar lines during the decoding process. On the other hand, if the modification is too small, the marker detection process is more likely to miss-identify some of the markers, since the appearance of such markers in the image of a reflection of the projected pattern can be too similar to the non-modified feature types. However, since having markers according to examples of the presently disclosed subject matter does not significantly damage the quality of depth information which is extractable from the projected pattern, many markers can be included in the pattern, and so while the marker detection process may indeed miss some of the markers, there would typically be enough markers left which would be successfully identified.

It would be appreciated that even when many markers are included in the pattern, the number of feature types is much larger. From another perspective, within the pattern, the feature types' density is much greater than the markers' density. The epipolar distance between pairs of identical feature types is significantly smaller than the epipolar distance between pairs of markers.

According to examples of the presently disclosed subject matter, markers can be used to support decoding and feature element and feature type extraction, including under circumstances where decoding is challenging, difficult or even impossible without use of the marker. For example, a marker detection process can be used to detect a marker, and having knowledge of the markers design, including knowledge of feature element and feature type structure (the identities of the feature types in the marker may be known), and having pre-existing knowledge of which feature elements and which feature types surround the marker, can be used to decode the projected pattern. For example, identifying the markers together with knowledge of the code layout and of features' design and structure (of feature elements and feature types) can be used to extract feature types (and possibly also feature elements) from an image of a reflection of the projected pattern including the markers.

Figure 9:
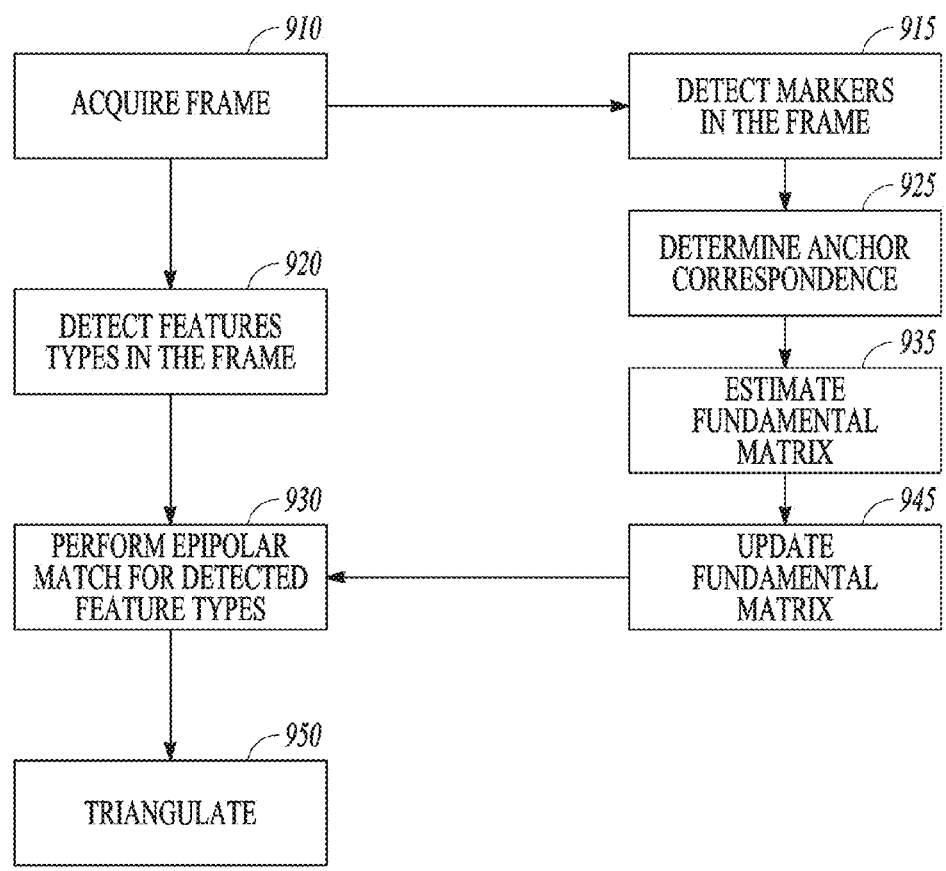
FIG. 9 is a flowchart illustrating a high level method of single frame calibration of an active triangulation setup according to examples of the presently disclosed subject matter.

FIG. 9, to which reference is now made, is a flowchart illustrating a high level method of single frame calibration of an active triangulation setup according to examples of the presently disclosed subject matter. At block 910, a frame, depicting a reflected portion of a projected structured light pattern, can be acquired, for example, using a sensor of the active triangulation setup. At 920, the feature types of the projected structured light pattern are detected in the frame.

Meanwhile, markers detection and FM estimation processes can be implemented. Optionally, the markers detection and FM estimation processes can be implemented in real-time or in near real-time. In other examples, markers detection and FM estimation processes can be implemented at any time relative to the feature type detection, localization and triangulation processes. In still further examples, markers detection and FM estimation processes can be implemented per each frame that is captured using the respective active triangulation setup. In yet other examples, markers detection and FM estimation processes can be implemented from time to time for only some of the frames that are captured using the respective active triangulation setup.

Resuming now the description of FIG. 9, on initiation of the markers detection process, markers appearing in the frame are detected at 915, for example, as described above. At 925, markers correspondence and matching is determined. Optionally, the markers correspondence and matching operation is implemented with certain constraints and assumptions regarding the drift between a marker appearance in a frame capturing a reflected portion of the projected structured light pattern and the location in the image plane of the epipolar line with which the marker is associated. Am epipolar line is stored for each marker in the projected structured light pattern. The epipolar lines for the markers in the projected structured light pattern are extracted according to a certain fundamental matrix (which reflects a current calibration state). The markers detected in a frame are associated with the stored epipolar lines according to each markers location in the frame, and according to the FM (which reflects a current calibration state). The association of a marker appearance and a respective stored epipolar line is preformed according to predefined criteria. For example, the marker is associated with the nearest stored epipolar line. Other criteria can also be used, including various distribution tracking operations, optimization algorithms, and statistics algorithms. For example, correspondence ambiguities can be resolved by discarding the ambiguous markers. In yet another example, a predefined ordering scheme of the markers in the projected structured light pattern can be used, and markers association with the prestored epipolar lines can be implemented based on the predefined ordering scheme. In case that there is a drift (and optionally as long as the drift does not exceed nor contradicts the constraints and assumptions regarding the drift) in the markers location in the frame relative to the location of the prestored epipolar line with which it is associated, the process proceeds to block 935, in which the fundamental matrix is estimated based at least on markers correspondences, and the fundamental matrix may be updated at 945 based at least on markers matching.

At 930, based on the detected feature types, and utilizing the fundamental matrix (which may have been updated by the process in blocks 915, 925, 935, and 945), an epipolar match for all detected features is performed. Triangulation is then performed at 950.

In one embodiment, there are a sufficient number of markers distributed in the projected structured light pattern, so that in a frame capturing a reflected portion of a structured light pattern including the markers, it is highly probable that a required minimum number of markers (e.g., most of the markers, or at least eight of the markers) are detected. According to examples of the presently disclosed subject matter, the fundamental matrix estimation process described herein requires at least eight correctly detected markers (based on the eight point algorithm), but the number of markers can be any number. The actual number of markers that are used in each case can represent a balance between marker detectability, processing requirements, decodability, and correspondence ambiguities.

In one embodiment, the marker correspondence determination process can include prediction techniques, which may be utilized as part of the search for correspondences. For example, in practice, system design can constrain the changes in the FM, therefore, in some cases it may be possible to predict the regions where the detected markers can end up, following such changes. Thus, the distribution of the projected markers should reduce or even minimize the overlaps between these regions to reduce or rule out the ambiguities in marker matching.

Potential ambiguities may be further resolved using drift constraints, or, if there are enough markers detected, the ambiguous matches can be simply discarded. For example, disparity constraints can be derived assuming that the calibration errors do not exceed a certain calibration error threshold, for example, in the order of 5%-25%. It would be noted that under certain circumstances, and using certain implementations of the presently disclosed subject matter, for example, depending on the scene, some of the markers embedded in the code will not be successfully detected at block 915. Such failures in detecting a marker are referred to as false-negatives. Further, some features can be erroneously detected as markers. Such erroneously detected markers are referred to as false-positives. By tuning the placement of the markers in the structured light pattern, their shape and form, and the number of markers that are used, various errors which are related to markers and their use can be kept at an acceptable level.

Markers should not be distributed too densely in the structured light pattern so that they can be correctly matched. The number of markers in a pattern and the density or distribution of markers (including criteria for determining whether the markers are too dense, or too scarce) can be associated with system design, and operation parameters, such as mechanical robustness and tolerances, environmental parameters, such as temperature, humidity, shocks and vibrations and a desired balance between markers detectability, processing requirements, decodability and correspondence ambiguities. For example, the number of markers may be limited to a few tens to avoid a too dense distribution. Statistical analysis and other methods can be used to determine an acceptable or even optimal configuration of the markers, their shape or form, their placement in the structured light pattern, and the number of markers to be used. The presence of too many false-positives and false-negatives will render the single-frame FM estimation incorrect.

The marker distribution according to examples of the presently disclosed subject matter is set so that an epipolar distance between any two epipolar lines which are associated with an appearance in the image of any two respective markers from said plurality of markers is greater than a distance between any two distinguishable epipolar lines. Thus, when a calibration error causes an epipolar matching error that is in an extent that is greater than the distance between distinguishable epipolar lines but is less than the distance between epipolar lines which are associated with an appearance in the image of respective markers, the markers can be used to determine an epipolar field for the active triangulation setup according to locations of the markers in the image and locations of matching markers in the projected structured light pattern. In one example, an epipolar distance between any two epipolar lines which are associated with an appearance in the image of any two respective markers from said plurality of markers is greater by a factor of at least two than a distance between any two distinguishable epipolar lines.

In accordance with an example of the presently disclosed subject matter, marker detection can involve several sub-operations. For example, initially a set of suspected markers can be extracted from the frame using the marker detection operations mentioned herein, and the suspected markers can be processed in one or more processing iterations to provide a reduced set, forming the set of detected markers. Additional measures for filtering suspected markers to provide a more reliable set of detected markers can be achieved in a multi frame-approach, which is described below.

A multi-frame approach may be used as part of the marker detection operation (or procedure) to reduce the effect of false-positives and false-negatives. In one embodiment, the method shown in FIG. 9 and described herein with reference to FIG. 9, can be adapted and used to accumulate, over a number (e.g., two, three, . . . , n) of frames, the markers detected in each of the frames, analyze the accumulated markers, rule out false-positives, and estimate the fundamental matrix.

To rule out the false-positives, the fact that in dynamic scenes the detected true markers should be arranged along straight lines across multiple frames can be used. In static scenes the detected true markers should appear at the same camera coordinates in all frames. It would be appreciated that in the multi-frame implementation of the fundamental matrix estimation process according to examples of the presently disclosed subject matter, the detected true markers can be arranged along lines having a predefined curve across multiple frames, since the frames are distorted, e.g. due to the respective camera optics having radial (or other) distortions, and that the marker detection operation can be configured accordingly.

Figure 10:
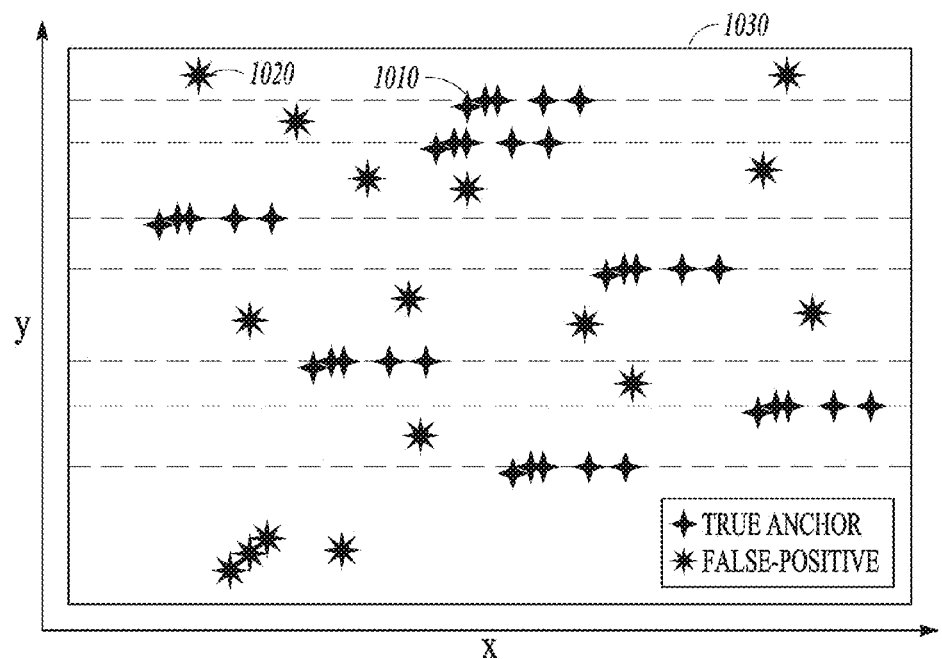
FIG. 10 is a graphical illustration of markers accumulated over a plurality of frames and arrange along parallel epipolar lines with which the markers are associated, with some outliers which do not fall on or near the epipolar lines, in accordance with examples of the presently disclosed subject matter.

In a canonical setup, the projector and the camera are facing strictly forward. Optionally, the Epipolar lines are parallel and thus the markers are also arranged along parallel lines as shown in FIG. 10. In FIG. 10, true markers are indicated by four pointed stars (for example, the four pointed start marked 1010) and false-positives are noted by seven pointed stars (for example, the seven pointed start marked 1020). Several of each are shown.

If the calibration changes preserve the canonical setup or causes a small deviations around it, the markers locations can be approximately detected, for example, by building a probability distribution of their position on the epipolar lines which are associated with appearance in the frame of a marker that is included in the projected structured light pattern. The appearance of the markers is expected to remain on a constant y coordinate value (or a nearly constant y coordinate value, with some permitted deviation) over a plurality of frames. For example, as is shown in FIG. 10, the four pointed stars on line 1030 all have the same or almost the same y coordinate. The probability distribution can be estimated using histogram analysis. Further by way of example, to avoid incorrect binning issues, a Parzen approach may be used to build a non-parametric density distribution.

$$p(y)=\Sigma_i \rho(y-y_i), \qquad \text{(Formula 2)}$$

$\rho(y)=[1; 2; 8; 2; 1]$ (or any other relevant Parzen window)

Figure 11:
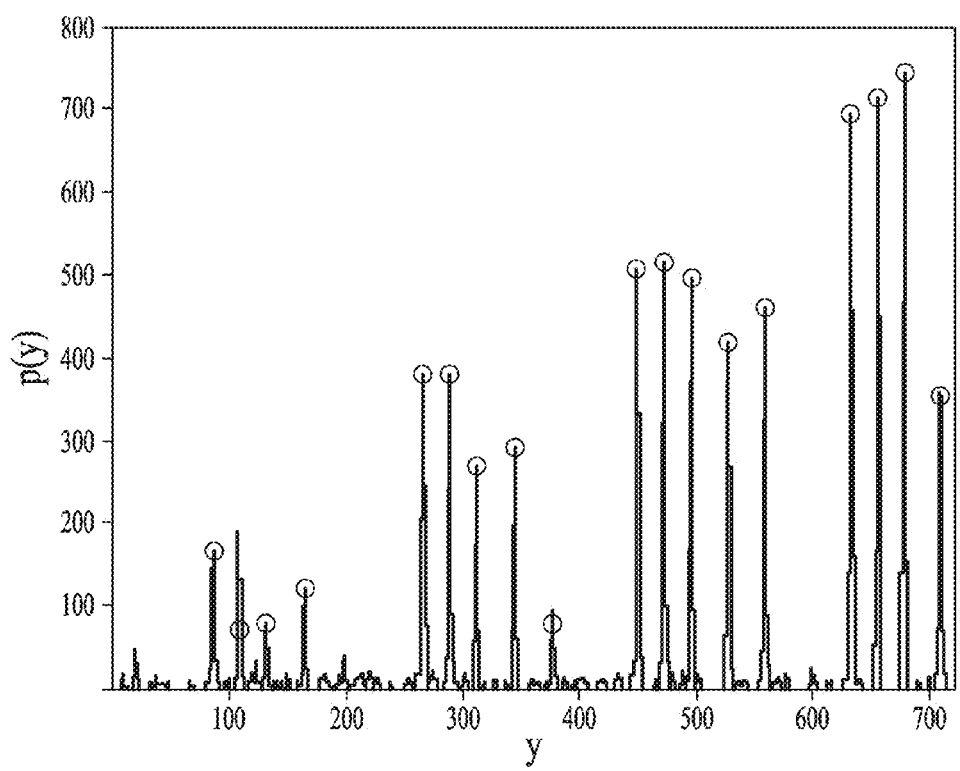
FIG. 11 is a graph illustrating a marker distribution density over a plurality of frames graph, in accordance with some examples of the presently disclosed subject matter, where the y-axis corresponds to a location of the markers after a projection on a vector which is perpendicular to the epipolar field (or to an epipolar line representing the epipolar field) of the active triangulation setup, and the p(y) axis is the number of markers detected at each point along the y-axis multiplied by the filter (in this case the Parzen window).

FIG. 11, to which reference is now made, illustrates a marker distribution density over a plurality of frames graph, in accordance with some examples of the presently disclosed subject matter, where the y-axis corresponds to a location of the markers after a projection on a vector which is perpendicular to the epipolar field (or to an epipolar line representing the epipolar field) of the active triangulation setup, and the p(y) axis is the number of markers detected at each point along the y-axis multiplied by the filter (in this case the Parzen window). The distribution function is peaked around the values of the y-coordinate of the true markers. The remaining nonzero values come from outliers (false-positives).

For each peak, the detected markers which have their y-coordinate close to the peak coordinate are selected. A random sample consensus (RANSAC) algorithm (or other robust estimation algorithms) can be used to pick points which are arranged along a straight line (or very close to the line). Using the fact that the way markers are distributed around the projector plane should reflect in the locations of the peaks, unique matching of true marker points is performed.

Figures 12, 13:
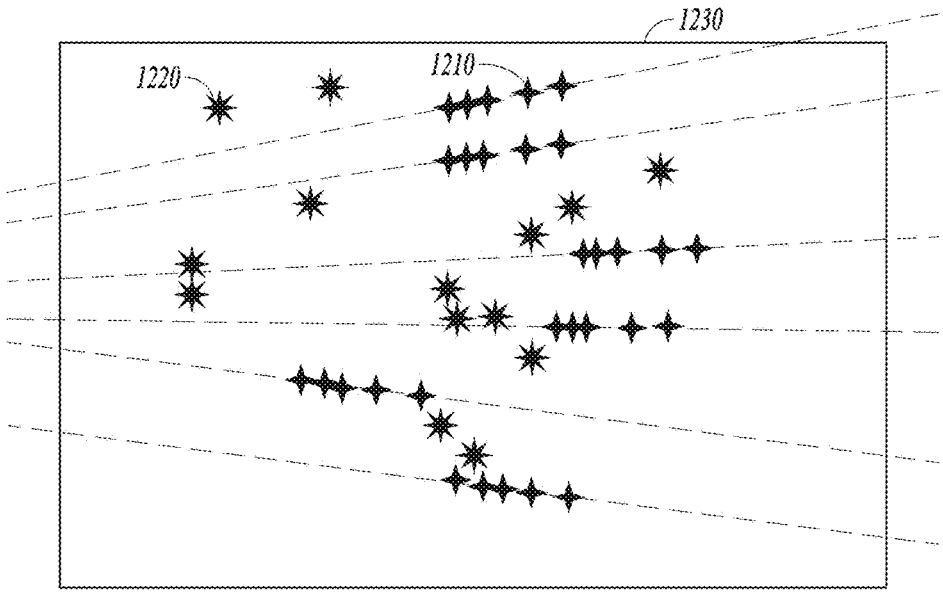
FIG. 12 is a graphical illustration of a true marker and false marker distribution plot that is obtained from a plurality of frames, for an active triangulation setup that creates Epipolar lines which not parallel, according to examples of the presently disclosed subject matter.
FIG. 13 is an illustration of a pseudo-code sequence implementation of a process for estimating an FM that produces a maximal number of detected points arranged along straight lines, in accordance with examples of the presently disclosed subject matter.

For an arbitrary active triangulation setup, the Epipolar lines may not be parallel. For example, referring to FIG. 12, there is shown a true marker and false marker distribution plot that is obtained from a plurality of frames, for an active triangulation setup that creates Epipolar lines which not parallel, according to examples of the presently disclosed subject matter. As is shown in FIG. 12, the active triangulation setup is such that the epipolar lines are not parallel, see for example the line marked 1230 and the lines next to it. True markers are indicated by four pointed stars (for example, the four pointed start marked 1210) and false-positives are noted by seven pointed stars (for example, the seven pointed start marked 1220). Several of each are shown. Nevertheless, it is possible to filter out false-positive by a brute force RANSAC approach, for example, or any other method that is suitable for detecting outliers in this scenario. In one example, an FM that produces a maximal number of detected points arranged along straight lines may be obtained as described in the pseudo-code sequence shown by way of example in FIG. 13.

Prior to estimating the FM, the active triangulation setup can be tested to determine whether it is calibrated or not. To test, the epipolar lines which are associated with an appearance in the frame of the markers can be obtained. These are the epipolar lines where the markers are expected to appear in the frame. Next the frame is processed and markers are detected. At this point the areas in the frames whose appearance matches the criteria of a marker can be regarded as detected markers, and so at this stage there are actually provisionally detected markers. Next, it is determined which of the provisionally detected markers fall on or close to the epipolar lines where the markers are expected to appear in the frame. The provisional markers detection can be evaluated to find out if a sufficient fraction or number of the provisionally detected markers lies on these lines (or very close to them). According to examples of the presently disclosed subject matter, the fraction of the detected markers which would be considered sufficient can depend on the system design, operation parameters, tolerances, environmental parameters and a desired balance between marker detectability, processing requirements, decodability and correspondence ambiguities.

Method 1300 begins by initializing a maximum set of markers at 1310. An iteration is also defined at 1320. During each iteration, a minimal set of detected markers, MinSet, is randomly selected at 1325. The MinSet is matched to projected markers at 1330, a testFM is estimated at 1335, epipolar lines which are associated with appearances of respective markers in the image plane are calculated at 1340, and all detected markers (TestSet) lying on the calculated lines are found. At 1350, if the number in TestSet is greater than the number in the MaxSet, the TestSet is merged into the MaxSet at 1355 and the TestFM is merged into the FM at 1360.

Figure 14:
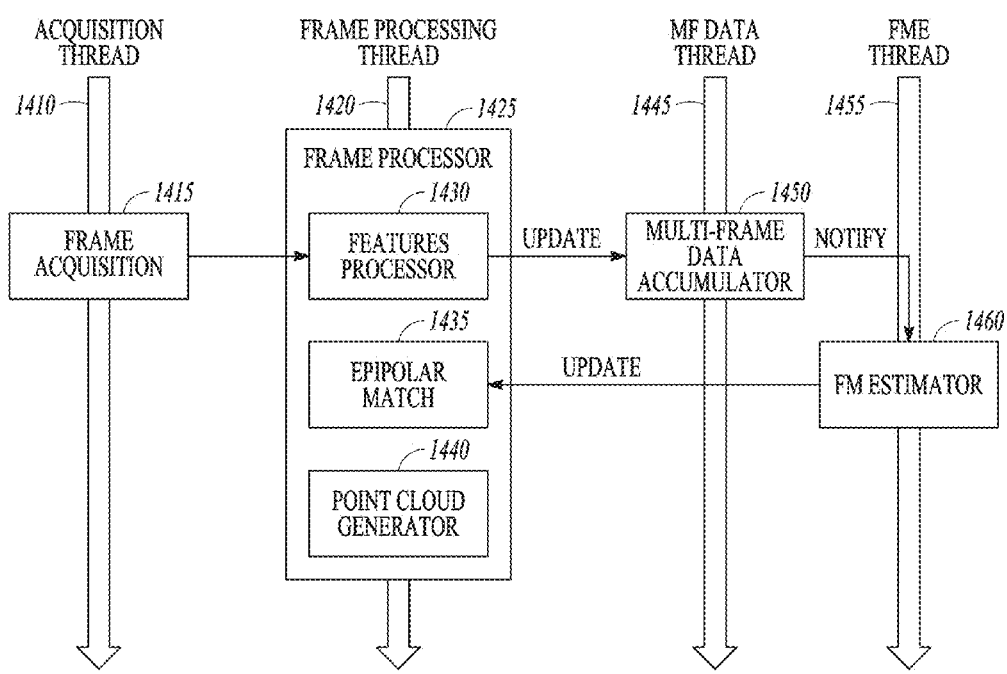
FIG. 14 is a block diagram illustration of a thread based software implementation of a calibration method according to examples of the presently disclosed subject matter.

A thread based block representation of a software implementation of a calibration method according to examples of the presently disclosed subject matter is shown in FIG. 14. An acquisition thread 1410 can be executed by a frame acquisition engine 1415. The acquisition thread 1410 may be utilized to generate digital signals from light that impinges an array of sensors (pixels). The light can have different qualities and the signals generated by the acquisition thread 1410 can reflect some of these qualities. The acquisition thread 1410 is also capable of integrating the signals from a plurality of sensor cells (such as an array of pixels) to provide a two dimensional frame. For example, the acquisition thread 1410 can be configured to and operative for translating physical quantities representing intensity of light which corresponds to a reflected portion of the projected structured light signal (and ambient light) into a two dimensional grey-scale frame.

A frame processing thread 1420 can be executed by a frame processing engine 1425. The frame processing engine 1425 can include a features processor module 1430, an Epipolar match module 1435, and a point cloud generator module 1440. The frame processing engine 1425 utilizing the features processor module can process the frame provided by the frame acquisition engine 1415 to extract feature from the frame. In the example of the two dimensional grey-scale frame, and given, as an example, a bi-tonal structured light pattern, where each feature type is comprised of a unique spatial formation of feature elements (e.g., light and dark areas or maxima, minima and saddles), the feature processor module 1430 can be configured to identify in the frame markers, and feature types. Markers can be detected by implementing a marker detection procedure, which can include for example, evaluating distances between feature elements appearing a frame. The feature type identification process can involve mapping feature elements in the frame according to their local relative intensity (marking dark and bright areas) and identifying feature types in the frame according to the spatial formations of the corresponding feature types in the projected structured light pattern. The feature processor module 1430 can utilize various statistical analysis method and may take into account the adjacent areas (and neighboring feature types) to increase the robustness of the feature identification and localization.

The Epipolar match module 1435 can be configured to use a prestored mapping of distinguishable epipolar lines on the image plane to determine locations of identified features types in the frame. Using the feature types' identities and the locations of the identified feature types in the frame, the point cloud generator module 1440 can be utilized to extract depth information from the frame, for example, by triangulating the feature types appearing in the frame and the feature types in the projected structured light pattern. It would be appreciated that a point cloud is one possible form of depth information representation which can be used in the presently disclosed subject matter. Other forms of depth information representation can include: range maps, octree, OBJ, etc.

A multi-frame data thread 1445 includes a multi-frame data accumulator 1450. The multi-frame data thread 1445 can be executed for enabling and supporting the multi-frame fundamental matrix estimation process, including for example, the process and operations described with reference to FIGS. 8 and 9. The multi-frame data accumulator 1450 can be used to accumulate the data that is required by the calibration process for a plurality of frames. The multi-frame data accumulator 1450 can use a predefined memory unit or a certain allocated area on a memory unit for storing the multi-frame calibration data.

An FM estimator thread 1455 can include an FM estimator module 1460. The FM estimator module 1460 is configured to carry out the FM estimation process and operations described herein, for example, with reference to FIGS. 4, 9-13. When FM estimation is done, its validity is tested (e.g., using the epipolar match test mentioned above) and the frame processor 1425 is notified via Epipolar match module 1435 to use it in the next frame processing cycle.

The different operations according to examples of the presently disclosed subject matter are divided to different threads or processes in FIG. 14 (and throughout the description). This division is merely one possibly example of the manner in which the operations according to examples of the presently disclosed subject matter can be divided to separate different hardware components or different software constructs and possibly different processor cycles, and combinations thereof.

Figure 15:
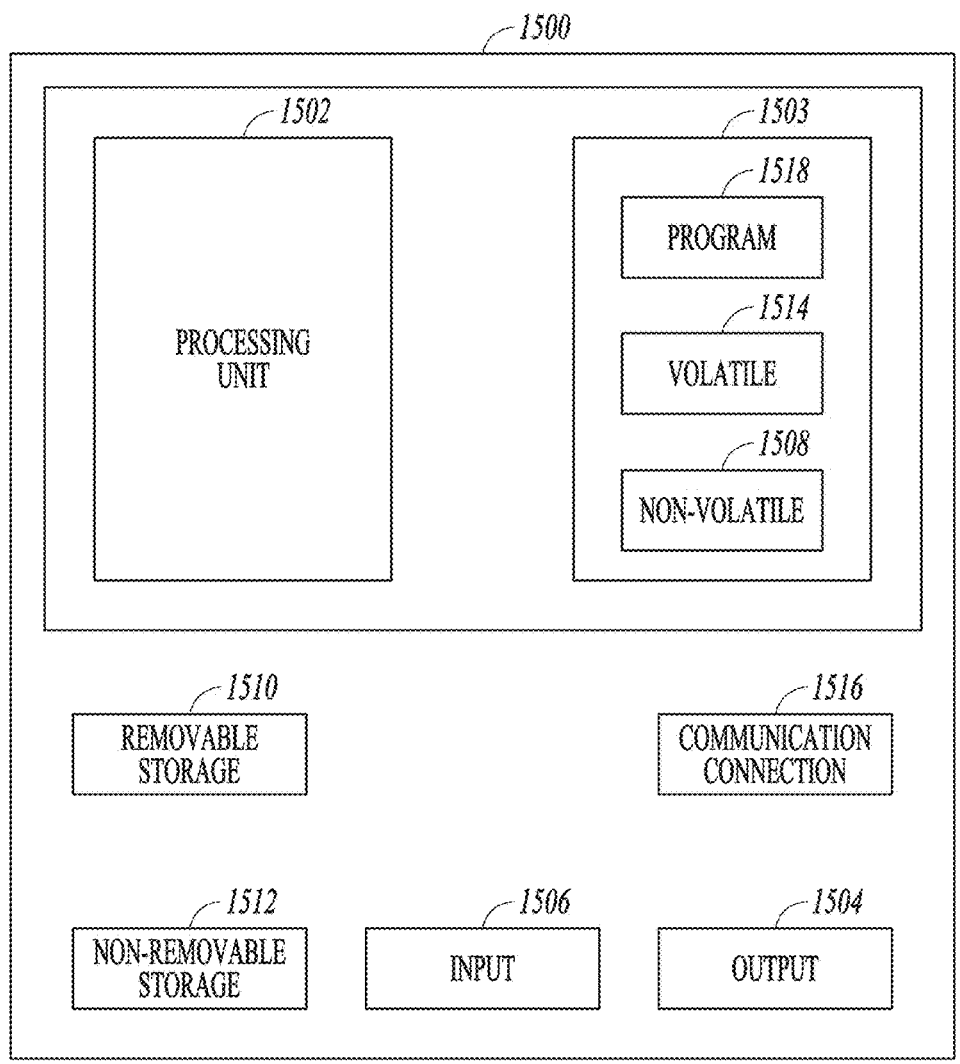
FIG. 15 is a block schematic diagram of a computer system to implement one or more methods or an active triangulation setup according to examples of the presently disclosed subject matter.

FIG. 15 is a block schematic diagram of a computer system 1500 to implement one or more methods or an active triangulation setup according to examples of the presently disclosed subject matter. In one embodiment, multiple such computer systems are utilized in a distributed network to implement multiple components in a transaction based environment. One example computing device in the form of a computer 1500, may include a processing unit 1502, memory 1503, removable storage 1510, and non-removable storage 1512. Memory 1503 may include volatile memory 1514 and non-volatile memory 1508. Computer 1500 may include—or have access to a computing environment that includes—a variety of computer-readable media, such as volatile memory 1514 and non-volatile memory 1508, removable storage 1510 and non-removable storage 1512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1500 may include or have access to a computing environment that includes input 1506, output 1504, and a communication connection 1516. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1502 of the computer 1500. A hard drive, CD-ROM, and RAM are some examples of articles including a non-transitory computer-readable medium. For example, a computer program 1518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 900 to provide generic access controls in a COM based computer network system having multiple users and servers.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The Invention claimed is:

1. A computer system for calibrating an active triangulation setup, comprising:
 a memory unit configured to store an image of a reflected portion of a projected structured light pattern that is comprised of a repeating structure of a plurality of unique feature types and a plurality of markers, each one of the plurality of feature types serves as a distinct codeword, and each unique feature type from the plurality of features appears at most once along any one of a first plurality of distinguishable epipolar lines,
 wherein each one of the plurality of markers has an appearance that is different in at least one visual aspect from any one of a plurality of non-marker feature types, and each marker from the plurality of markers appears at most once along any one of a second plurality of distinguishable epipolar lines,
 wherein each pair of adjacent distinguishable epipolar lines from the second plurality of epipolar lines is separated by a distance that is greater than a distance between any two distinguishable epipolar lines from the first plurality of epipolar lines;
 a processor that is configured to carry out epipolar matching, whereby a feature type from the plurality of feature types is associated with a distinguishable epipolar line from the first plurality of distinguishable epipolar lines,
 wherein the processor is configured to correct an epipolar matching error based on matching of a location of a marker from the plurality of markers in the projected structured light pattern and a location in the image of a respective epipolar line from the second plurality of epipolar lines.

2. The computer system according to claim 1, wherein the processor is configured to correct the epipolar matching error using the markers when the epipolar matching error is in an extent that is greater than the distance between distinguishable epipolar lines from the first plurality of distinguishable epipolar lines but is less than the distance between epipolar lines from the second plurality of distinguishable epipolar lines.

3. The computer system according to claim 1, wherein the epipolar distance between any two adjacent distinguishable epipolar lines from the second plurality of distinguishable epipolar lines is greater by a factor of two or more than a distance between any two adjacent distinguishable epipolar lines from the first plurality of distinguishable epipolar lines.

4. The computer system according to claim 1, wherein the memory unit is further configured to store marker distribution rules or an ordering scheme of the markers according to which the markers are distributed in the projected structured light pattern.

5. The computer system according to claim 4, wherein the processor is configured to use the marker distribution rules or the ordering scheme of the markers when preforming the epipolar matching and/or when preforming the correction of the epipolar matching errors.

6. The computer system according to claim 1, wherein each one of the plurality of feature types is formed by a unique combination of feature elements, and wherein each one of the plurality of markers includes one or more pairs of feature elements between which the epipolar distances are different relative to distances between respective corresponding feature elements in non-marker areas of said pattern.

7. The computer system according to claim 6, wherein at least one of the plurality of markers is characterized by a respective distortion area, and wherein within each distortion area epipolar distances between one or more pairs of feature elements are different relative to a corresponding non-marker area.

8. The computer system according to claim 7, wherein the distortion area is characterized by a distortion selected from the following group: pinching, twirling, puckering or bloating.

9. The computer system according to claim 1, wherein the processor is configured to decode the image, wherein at least one marker from the plurality of markers is classified as a feature type from the plurality of feature types, and a respective codeword is assigned to the marker.

10. The computer system according to claim 9, wherein the processor is configured to classify the at least one marker as a feature type from said plurality of feature types, when the epipolar distances between one or more pairs of feature elements of the marker are within a tolerance implemented by the processor for detecting feature types.

11. The computer system according to claim 1, wherein at least one of the markers from the plurality of markers is a certain area of the pattern, within which epipolar distances between one or more pairs of feature elements is different relative to distances between respective feature elements in non-marker areas of the pattern.

12. The computer system according to claim 1, wherein the active triangulation setup has a predefined operating range, and in the image, two or more repetitions of a feature type and/or of markers appear on a distinguishable epipolar line from said first plurality of distinguishable epipolar lines and/or from said second plurality of distinguishable epipolar lines, but within any given section of an epipolar line from said first or second plurality of distinguishable epipolar lines which corresponds to the operating range of the active triangulation setup, any feature type and or any marker appears at most once.

13. The computer system according to claim 12, wherein the processor is configured to carry out the epipolar matching and/or the correction of the epipolar matching error based on a location in a given section of a distinguishable epipolar line from said first or second plurality of distinguishable epipolar lines of a given feature type or marker.

14. The computer system according to claim 1, wherein the first plurality of distinguishable epipolar lines and/or the second plurality of epipolar lines are curved.

15. The computer system according to claim 1, wherein the first plurality of distinguishable epipolar lines and/or the second plurality of epipolar lines are not parallel to one another.

16. An active triangulation system, comprising:
an active triangulation setup, comprising:
a projector configured to project a structured light pattern that is comprised of a repeating structure of a plurality of unique feature types and a plurality of markers, each one of the plurality of feature types serves as a distinct codeword, and each unique feature type from the plurality of features appears at most once along any one of a first plurality of distinguishable epipolar lines,
wherein each one of the plurality of markers has an appearance that is different in at least one visual aspect from any one of a plurality of non-marker feature types, and each marker from the plurality of markers appears at most once along any one of a second plurality of distinguishable epipolar lines,
wherein each pair of adjacent distinguishable epipolar lines from the second plurality of epipolar lines is separated by a distance that is greater than a distance between any two distinguishable epipolar lines from the first plurality of epipolar lines;
a sensor that is configured to capture an image of a reflected portion of the projected structured light; and
a processor that is configured to correct an epipolar matching error based on matching of a location of a marker from the plurality of markers in the projected structured light pattern and a location in the image of a respective epipolar line from the second plurality of epipolar lines.

17. The system according to claim 16, wherein the processor is configured to correct the epipolar matching error using the markers when the epipolar matching error is in an extent that is greater than the distance between distinguishable epipolar lines from the first plurality of distinguishable epipolar lines but is less than the distance between epipolar lines from the second plurality of distinguishable epipolar lines.

18. The system according to claim 16, wherein the epipolar distance between any two adjacent distinguishable epipolar lines from the second plurality of distinguishable epipolar lines is greater by a factor of two or more than a distance between any two adjacent distinguishable epipolar lines from the first plurality of distinguishable epipolar lines.

19. The system of claim 16, wherein each one of the plurality of feature types is formed by a unique combination of feature elements, and wherein each one of the plurality of markers includes one or more pairs of feature elements between which the epipolar distances are different relative to distances between respective corresponding feature elements in non-marker areas of said pattern.

20. The system according to claim 19, wherein at least one of the plurality of markers is characterized by a respective distortion area, and wherein within each distortion area epipolar distances between one or more pairs of feature elements are different relative to a corresponding non-marker area.

21. The system according to claim 20, wherein the distortion area is characterized by a distortion selected from the following group: pinching, twirling, puckering or bloating.

22. The system of claim 16, wherein the processor is configured to decode the image, wherein at least one marker from the plurality of markers is classified as a feature type from the plurality of feature types, and a respective codeword is assigned to the marker.

23. The system of claim 22, wherein the processor is configured to classify the at least one marker as a feature type from said plurality of feature types, when the epipolar distances between one or more pairs of feature elements of the marker are within a tolerance implemented by the processor for detecting feature types.

24. The system of claim 16, wherein at least one of the markers from the plurality of markers is a certain area of the pattern, within which epipolar distances between one or more pairs of feature elements is different relative to distances between respective feature elements in non-marker areas of the pattern.

25. The system of claim 16, wherein the processor is configured to obtain marker distribution rules or an ordering scheme of the markers according to which the markers are distributed in the projected structured light pattern, and the processor is configured to use the marker distribution rules or the ordering scheme of the markers when preforming the epipolar matching and/or when preforming the correction of the epipolar matching errors.

26. The system according to claim 16, wherein the active triangulation system has a predefined operating range, and in the image, two or more repetitions of a feature type and/or of markers appear on a distinguishable epipolar line from said first plurality of distinguishable epipolar lines and/or from said second plurality of distinguishable epipolar lines, but within any given section of an epipolar line from said first or second plurality of distinguishable epipolar lines which corresponds to the operating range of the active triangulation system, any feature type and or any marker appears at most once.

27. The system according to claim 26, wherein the processor is configured to carry out the epipolar matching and/or the correction of the epipolar matching error based on a location in a given section of a distinguishable epipolar line from said first or second plurality of distinguishable epipolar lines of a given feature type or marker.

28. The method according to claim 27, wherein the epipolar matching and/or the correction of the epipolar matching error is based on a location in a given section of a distinguishable epipolar line from said first or second plurality of distinguishable epipolar lines of a given feature type or marker.

29. The system according to claim 16, wherein the first plurality of distinguishable epipolar lines and/or the second plurality of epipolar lines are curved.

30. The system according to claim 16, wherein the first plurality of distinguishable epipolar lines and/or the second plurality of epipolar lines are not parallel to one another.

31. A method of calibrating an active triangulation setup, comprising:
 obtaining through an interface an image from an image sensor of a reflected portion of a projected structured light pattern that is comprised of a repeating structure of a plurality of unique feature types and a plurality of markers, each one of the plurality of feature types serves as a distinct codeword, and each unique feature type from the plurality of features appears at most once along any one of a first plurality of distinguishable epipolar lines,
 wherein each one of the plurality of markers has an appearance that is different in at least one visual aspect from any one of a plurality of non-marker feature types, and each marker from the plurality of markers appears at most once along any one of a second plurality of distinguishable epipolar lines,
 wherein each one of the plurality of markers has an appearance that is different in at least one visual aspect from any one of a plurality of non-marker feature types, and each marker from the plurality of markers appears at most once along any one of a second plurality of distinguishable epipolar lines,
 wherein each pair of adjacent distinguishable epipolar lines from the second plurality of epipolar lines is separated by a distance that is greater than a distance between any two distinguishable epipolar lines from the first plurality of epipolar lines;
 using a processor to carry out epipolar matching, whereby a feature type from the plurality of feature types is associated with a distinguishable epipolar line from the first plurality of distinguishable epipolar lines; and
 using a processor to correct an epipolar matching error based on matching of a location of a marker from the plurality of markers in the projected structured light pattern and a location in the image of a respective epipolar line from the second plurality of epipolar lines.

32. The method according to claim 31, wherein said correcting is effective when the epipolar matching error is in an extent that is greater than the distance between distinguishable epipolar lines from the first plurality of distinguishable epipolar lines but is less than the distance between epipolar lines from the second plurality of distinguishable epipolar lines.

33. The method according to claim 31, wherein each one of the plurality of feature types is formed by a unique combination of feature elements, and wherein each one of the plurality of markers includes one or more pairs of feature elements between which the epipolar distances are different relative to distances between respective corresponding feature elements in non-marker areas of said pattern.

34. The method according to claim 33, wherein at least one of the plurality of markers is characterized by a respective distortion area, and wherein within each distortion area epipolar distances between one or more pairs of feature elements are different relative to a corresponding non-marker area.

35. The method according to claim 34, wherein the distortion area is characterized by a distortion selected from the following group: pinching, twirling, puckering or bloating.

36. The method according to claim 31, further comprising decoding the image, wherein at least one marker from the plurality of markers is classified as a feature type from the plurality of feature types, and a respective codeword is assigned to the marker.

37. The method according to claim 36, wherein said decoding comprises, classifying the at least one marker as a feature type from said plurality of feature types, when the epipolar distances between one or more pairs of feature elements of the marker are within a tolerance implemented by the processor for detecting feature types.

38. The method according to claim 31, wherein at least one of the markers from the plurality of markers is a certain area of the pattern, within which epipolar distances between one or more pairs of feature elements is different relative to distances between respective feature elements in non-marker areas of the pattern.

39. The method according to claim 31, further comprising obtaining marker distribution rules or an ordering scheme of the markers according to which the markers are distributed in the projected structured light pattern, and wherein at least one of said epipolar matching or said correcting an epipolar matching error uses said marker distribution rules or the ordering scheme of the markers.

40. The method according to claim 31, wherein the active triangulation setup has a predefined operating range, and in the image, two or more repetitions of a feature type and/or of markers appear on a distinguishable epipolar line from said first plurality of distinguishable epipolar lines and/or from said second plurality of distinguishable epipolar lines, but within any given section of an epipolar line from said first or second plurality of distinguishable epipolar lines which corresponds to the operating range of the active triangulation setup, any feature type and or any marker appears at most once.

41. The method according to claim 31, wherein the first plurality of distinguishable epipolar lines and/or the second plurality of epipolar lines are curved.

42. The method according to claim 31, wherein the first plurality of distinguishable epipolar lines and/or the second plurality of epipolar lines are not parallel to one another.

* * * * *